United States Patent
Gas et al.

(10) Patent No.: US 9,502,950 B2
(45) Date of Patent: Nov. 22, 2016

(54) METHOD OF MANUFACTURING ROTOR FOR ROTATING ELECTRICAL MACHINE

(75) Inventors: Olivier Gas, Paris (FR); Alexandre Pfleger, Weyer (FR)

(73) Assignee: Valeo Equipements Electriques Moteur (FR)

( * ) Notice: Subject to any disclaimer, the term of this patent is extended or adjusted under 35 U.S.C. 154(b) by 1067 days.

(21) Appl. No.: 12/599,559

(22) PCT Filed: Apr. 23, 2008

(86) PCT No.: PCT/FR2008/050739
§ 371 (c)(1),
(2), (4) Date: Jun. 18, 2010

(87) PCT Pub. No.: WO2008/145929
PCT Pub. Date: Dec. 4, 2008

(65) Prior Publication Data
US 2010/0257723 A1    Oct. 14, 2010

(30) Foreign Application Priority Data
May 11, 2007    (FR) .................................... 07 55014

(51) Int. Cl.
*H02K 21/04* (2006.01)
*H02K 15/03* (2006.01)

(52) U.S. Cl.
CPC ............ *H02K 21/044* (2013.01); *H02K 15/03* (2013.01); *Y10T 29/49012* (2015.01)

(58) Field of Classification Search
CPC .. H02K 21/044; H02K 21/048; H02K 1/226; H02K 1/243; H02K 15/022; H02K 15/03; Y10T 29/49012
USPC ......................................................... 29/598
See application file for complete search history.

(56) References Cited

U.S. PATENT DOCUMENTS

| 5,325,003 | A | * | 6/1994 | Saval et al. ...................... 310/43 |
| 5,543,676 | A | * | 8/1996 | York .................. H02K 21/044 310/152 |
| 6,486,585 | B1 | * | 11/2002 | Badey .................. H02K 21/044 310/156.38 |
| 6,548,935 | B1 | * | 4/2003 | Shendi et al. ................ 310/263 |

* cited by examiner

*Primary Examiner* — Livius R Cazan
(74) *Attorney, Agent, or Firm* — Berenato & White, LLC

(57) ABSTRACT

A method of manufacturing a rotor for rotating electrical machines, notably an alternator, the rotor including two magnet wheels defining between them at least one interpole space arranged to receive at least one magnet. At least one angular indexing mark is produced on at least one of the magnet wheels. At least one groove partially delimiting the interpole space is formed, by machining, on the magnet wheel while maintaining the magnet wheel in an angular position dependent on the angular indexing mark.

3 Claims, 5 Drawing Sheets

METHOD OF MANUFACTURING ROTOR FOR ROTATING ELECTRICAL MACHINE

FIELD OF THE INVENTION

The invention concerns in particular a method of manufacturing a rotor for a rotating electrical machine, in particular an alternator.

BACKGROUND OF THE INVENTION

The patent FR 2 793 085 describes an automobile vehicle alternator comprising a stator and a rotor mounted on a shaft. The rotor includes a coil and two pole wheels each provided with a plurality of claws. Interpole spaces that can receive rare earth permanent magnets are defined between the claws of the wheels. The method of manufacturing the rotor includes the step of machining grooves in the claws, once the pole wheels have been assembled, by means of one pass of a tool. This method has a number of drawbacks. For example, as the coil is assembled between the pole wheels before machining the grooves, lubricant is not used during machining, which leads to faster wear of the tool and/or slower machining. Moreover, because of the limitations imposed on the machining tool used, the interpole space between the grooves cannot be made as narrow as required. Finally, swarf produced by the machining can be introduced into the rotor.

SUMMARY OF THE INVENTION

The invention aims in particular to remedy the aforementioned drawbacks.

Thus the invention consists in a method of manufacturing a rotor for a rotating electrical machine, in particular an alternator, the rotor including two pole wheels defining between them at least one interpole space adapted to receive at least one magnet, the method including, before assembly of the two pole wheels, the following steps:
    producing on at least one of the pole wheels at least one angular indexing mark, and
    forming by machining on the pole wheel at least one groove partially delimiting the interpole space with the pole wheel secured in an angular position depending on the angular indexing mark.

Thanks to the invention, machining being carried out before assembling the pole wheels, the type of tool used to machine the groove (which can be a standard tool) can be chosen so as to be able to form a groove, and therefore an interpole space, of small size, thus enabling small magnets to be inserted into the interpole spaces.

It is equally possible to avoid the risk of cutting the wires of the coil that exists if machining is carried out after assembly and to have larger winding windows.

The risk of introducing swarf into the rotor can also be reduced.

It is further possible to modify the width of the machined groove without changing the machining tool, by varying the displacement of the tool during machining.

Moreover, as the grooves are machined before assembling the different components of the rotor, in particular a coil, it is possible to use a lubricant when machining the grooves.

What is more, machining can be effected for the most part upstream of the final rotor assembly line, for example by a supplier.

It is possible to have a single machining station for a number of assembly lines, if required.

The angular indexing marks of the invention, which serve as angular references, enable the corresponding pole wheel to be positioned precisely during machining. As the pole wheels can be assembled using the angular indexing marks as angular references, the relative disposition of the pole wheels can be precise, which ensures that the interpole spaces are themselves precise, so as to be able to insert magnets into them correctly.

In one embodiment of the invention the method includes, before assembling the two pole wheels, the step of adjusting the diameter of at least one of the pole wheels by machining a circumferential face of the pole wheel with the pole wheel secured in an angular position depending on the angular indexing mark.

The method can include the following step:
    producing a bore in the pole wheel with the pole wheel secured in an angular position depending on the indexing mark so as to form an interior passage adapted to receive a shaft of the rotating electrical machine.

The invention produces an interior passage at a precise position identified by the angular indexing mark or marks.

The method preferably includes the following step:
    assembling the pole wheels positioned angularly relative to each other by means of indexing marks produced on the pole wheels.

As the grooves delimiting the interpole spaces are machined with the pole wheels positioned relative to the indexing marks and the pole wheels are assembled taking the indexing marks as references, the grooves, which define functional surfaces, are positioned precisely relative to each other, which ensures that the interpole spaces have precise dimensions so that the permanent magnets can be inserted in them correctly.

In one embodiment of the invention, the pole wheel is secured in the predetermined angular position by at least one locating rod cooperating with at least one of the indexing marks of the pole wheel.

The locating rod can belong for example to a machine on which the pole wheel is machined or a machine on which two pole wheels are assembled.

The locating rods are for example retractable rods that can be engaged with the indexing marks of the pole wheels and retracted to be disengaged from those marks.

The locating rod or rods can be adapted to be moved parallel to or perpendicular to a longitudinal axis of the pole wheel, depending on the embodiment.

In one embodiment of the invention, the pole wheel includes at least two consecutive claws and the indexing mark is formed between two consecutive claws of the pole wheel.

For example, the indexing mark can be formed at an equal angular distance from the two claws. Alternatively, the indexing mark can be formed closer to one of the claws.

If required, the indexing mark can be formed on a lateral face of the pole wheel, the indexing mark having in particular a hollow shape, for example being a notch. This notch has a substantially circular arc shaped cross section, for example. The indexing mark can for example extend between two opposite plane faces of the pole wheel.

If necessary, the pole wheel can include two angular indexing marks, in particular diametrally opposed. Alternatively, the indexing marks can be disposed one relative to the other at an angular distance less than 180°.

It is equally possible to have on one pole wheel an angular indexing mark between the claws of each consecutive pair, which marks can then serve as polarizers.

The angular indexing mark is advantageously formed by removing material, in particular by machining.

In one embodiment of the invention, the method includes a step of calibrating the pole wheel and the angular indexing mark is produced by machining during or after calibrating the pole wheel. This calibration step adjusts the dimensions of the pole wheel, for example by cold pressing in a mold.

The angular indexing mark can advantageously be produced before machining the groove partially defining the interpole space.

In another embodiment of the invention, when the pole wheel is produced by molding, the indexing mark can be produced as part of molding the pole wheel. A step can be provided for removing any flash from the indexing mark after extraction of the pole wheel from the mold.

The rotor preferable includes a coil and at least one interpole magnet, and the method includes the following step:

after assembling the two pole wheels, the coil and the interpole magnet, impregnating at least the coil and the interpole magnet with a varnish.

The invention enables the coil and the interpole magnets to be impregnated in only one step, which reduces the cost of production.

The rotor can include front and rear fan elements, notably provided with blades, the method being characterized in that it includes, after assembling the two pole wheels and fixing the fan elements to the pole wheels, a step of impregnating the rotor with a varnish.

In this way the ventilation elements can be protected from corrosion by the varnish.

The invention also consists in a pole wheel for rotating electrical machine rotors, characterized in that it includes an angular indexing mark, in particular produced by removing material.

For example, the angular indexing mark can include a notch formed between two consecutive claws of the pole wheel.

The notch is advantageously produced by machining the pole wheel.

In one embodiment of the invention, the wheel includes at least one claw on which is formed at least one groove adapted to form, after assembly with another pole wheel, an interpole space in which at least one magnet is inserted.

The invention further consists in a rotor including two pole wheels as defined hereinabove.

The invention further consists in a rotating electrical machine, in particular an automobile vehicle alternator, including a stator and a rotor as defined hereinabove.

The invention further consists in a method of manufacturing a rotor of a rotating electrical machine, in particular an alternator, the rotor including two pole wheels, the method including the following steps:

producing on each pole wheel at least one angular indexing mark,
assembling the pole wheels with them disposed angularly relative to each other using the indexing marks as angular references.

BRIEF DESCRIPTION OF THE DRAWINGS

The invention can be better understood by reading the following detailed description of non-limiting embodiments of the invention and examining the appended drawings, in which.

Figure 1:
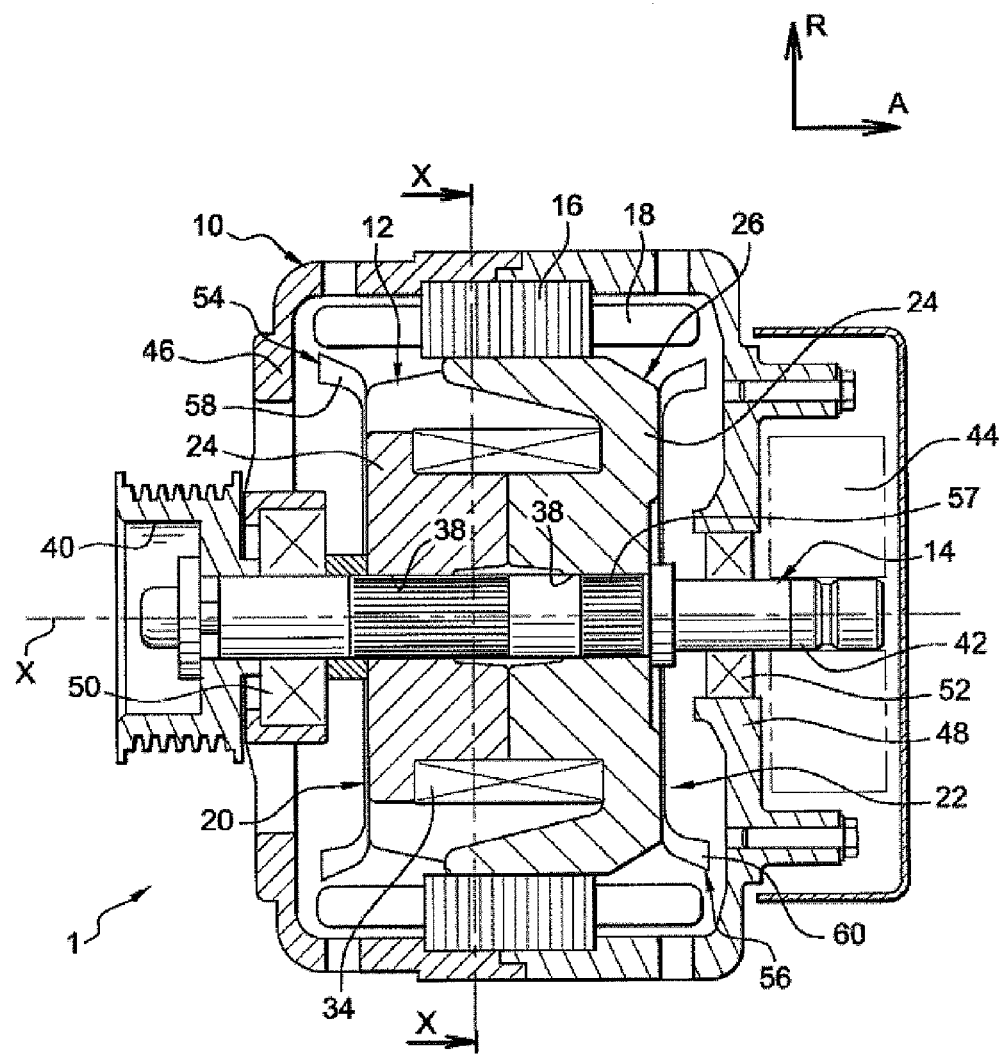
FIG. 1 is a partial diagrammatic representation in longitudinal section of an alternator conforming to one embodiment of the invention.

The axial and radial directions referred to in the remainder of the description are indicated by the arrows "A" and "R", respectively, in FIG. 1.

DETAILED DESCRIPTION

There is represented in FIG. 1 a polyphase rotating electrical machine 1 which in the present embodiment of the invention takes the form of an automobile vehicle alternator. If required, the electrical machine 1 can be reversible and form an alternator-starter that can operate in electric motor mode, in particular to start the internal combustion engine of the vehicle.

This machine 1 includes a casing 10 and, inside the latter, a rotor 12 constrained to rotate with a central shaft 14, called the rotor shaft, about its axis X, and a stator 16 that surrounds the rotor 12 and that includes a laminated body with cut-outs for mounting a stator coil 18 forming a bun-shaped assembly on either side of the stator 16, i.e. at each axial end thereof.

Figure 5:
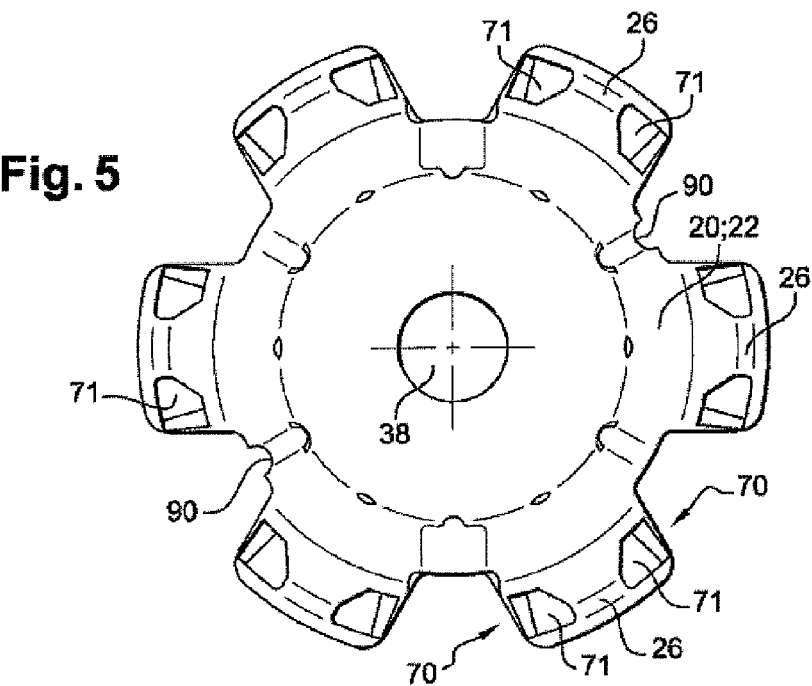
FIG. 5 is a partial diagrammatic representation of the pole wheel from FIG. 4 as seen from below.

The rotor 12 includes two pole wheels 20 and 22 each provided with a transverse flange 24 to a periphery of which is connected a plurality of claws 26 extending substantially in the axial direction A so as to form recesses 27 between each of the two consecutive claws 26 of the pole wheel. The claws 26 of each of the pole wheels 20, 22 are spaced apart in a circumferential direction, as illustrated in FIG. 5.

Figure 6:
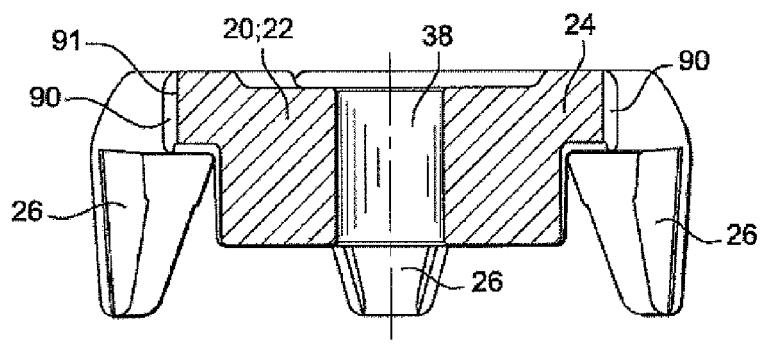
FIG. 6 is a partial diagrammatic representation in section of the FIG. 4 pole wheel.

The claws 26 have a trapezoidal overall shape when viewed in a radial direction R, as can be seen in FIG. 6 for example.

Figure 10:
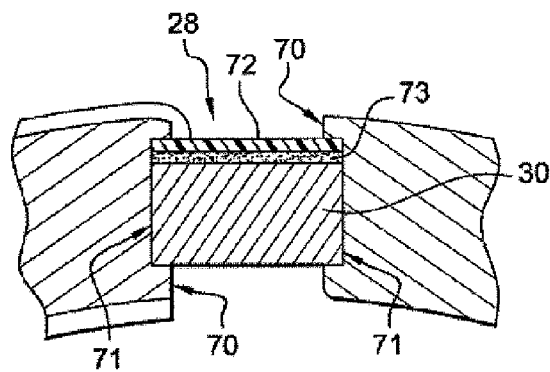
FIG. 10 is a partial diagrammatic representation in section taken along the line X-X of a detail of the rotor of the FIG. 1 machine.

The claws 26 of one pole wheel form with the claws 26 of the other pole wheel interpole spaces 28 adapted to receive one or more permanent magnets 30, as explained hereinafter with reference to FIG. 10.

An excitation winding 34 is placed between the flanges 24 of the pole wheels 20 and 22.

Each pole wheel 20; 22 includes a bore forming an interior passage 38 adapted to receive the shaft 14.

The pole wheels 20 and 22 are produced in steel, for example.

When the shaft 14 is rotating and the excitation winding 34 is activated by an electrical power supply, the inductor rotor 12 generates an induced alternating current in the stator 16.

The shaft 14 carries at its front end a pulley 40 belonging to a device for transmitting motion via at least one belt (not shown) between the alternator 1 and the internal combustion engine of the automobile vehicle and at its rear end 42 collector rings connected by wire connections (not shown) to the excitation winding 34 of the rotor 12.

Brushes on a brush-holder 44 represented in a highly diagrammatic manner rub on the collector rings in order to supply the winding 34 with electric current.

In the embodiment considered here, the casing 10 comprises two parts, namely a front bearing 46 substantially adjacent the pulley 40 and a rear bearing 48 carrying the brush-holder 44.

The bearings 46 and 48 each carry a respective ball bearing 50 and 52 for rotational mounting of the shaft 14.

The alternator 1 also includes means for cooling it.

For example, as shown in FIG. 1, the bearings 46 and 48 include perforations to enable cooling of the alternator by circulation of air.

In the embodiment described, at least one of the axial ends of the rotor 12 carries a fan adapted to circulate air. A first fan element 54 is provided on the front transverse face of the rotor 12, for example, and a second fan element 56 is provided on the rear face of the rotor 12. Each fan element 54 and 56 is provided with a plurality of blades 58 and 60.

In the embodiment described, each pole wheel 20; 22 includes six claws 26 so as to define a rotor with 12 interpole spaces 28.

Alternatively, the rotor 12 can include 2, 4, 6, 8 or 10 interpole spaces 28, according to the type of electrical machine required.

A detail of the rotor 12 is described next with reference to FIGS. 5 and 10.

Each claw 26 of a pole wheel 20; 22 has two lateral faces 70 defining with faces 70 of the other pole wheel 20; 22 the interpole spaces 28.

Each lateral face 70 is provided with a groove 71 of substantially rectangular section, which is produced in the embodiment considered here by a machining process, as explained hereinafter.

The magnets 30 inserted in the interpole spaces 28 are permanent magnets, for example rare earth or ferrite magnets, in particular with a rectangular cross section.

If necessary, a plate or foil 72 can be disposed on the radially exterior face of each magnet 30 with an adhesive layer 73 between them.

Of course, inserting the magnets 30 in the interpole spaces 28 without using the plates 72 does not depart from the scope of the present invention.

Various steps in the manufacture and assembly of the pole wheels 20 and 22 are described hereinafter, in particular with reference to FIG. 2.

In a first step 80, the pole wheels 20 and 22 are produced by moulding them in steel.

Each pole wheel 20; 22 produced by moulding includes the flange 24 and the claws 26.

Then, in a step 81, there is produced on each pole wheel 20; 22 at least one angular indexing mark 90, visible in FIG. 4, for example, the function of which is explained hereinafter.

In the embodiment described, this indexing mark 90 is formed during calibration of the pole wheel 20; 22 by machining the pole wheel.

Alternatively, the indexing mark 90 can be formed beforehand when moulding the pole wheel 20; 22 and then made good by cold forging to eliminate any flash at the location of the indexing mark 90.

Figure 4:
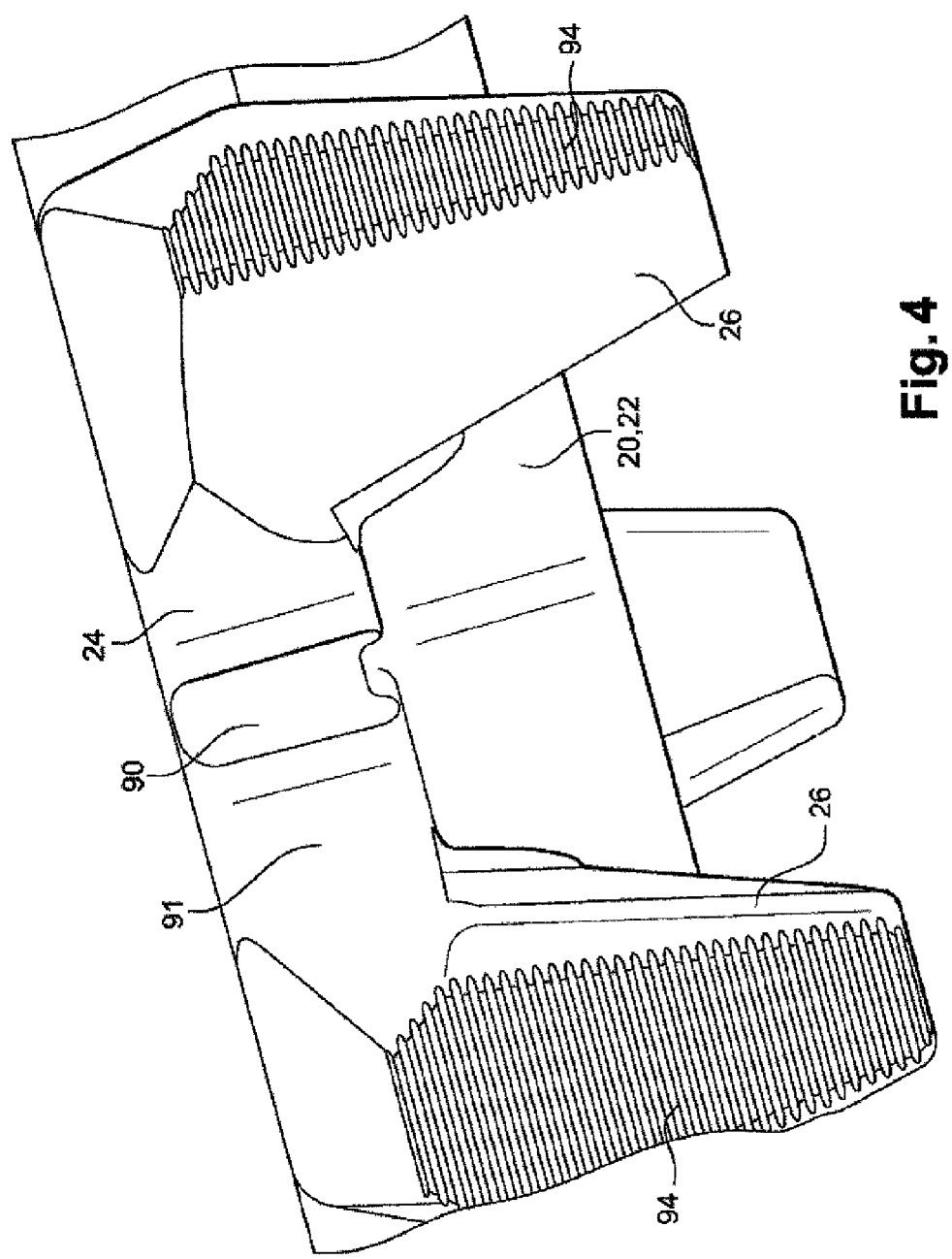
FIG. 4 is a partial diagrammatic representation of a pole wheel of the rotor for the FIG. 1 alternator as seen from the side.

In the embodiment shown in FIGS. 4 to 6, the indexing mark 90 includes a notch formed on a flank or lateral face 91 of the flange 24 of the pole wheel 20; 22 so as to extend substantially in the axial direction A.

This mark 90 lies in one of the recesses 27 between two consecutive claws 26 of the pole wheel 20; 22 at an equal angular distance from those two claws 26 as best shown in FIGS. 4 and 5.

The indexing mark 90 can have a circular arc shaped cross section, as shown in FIG. 5.

The invention is not limited to this notch shape, and the notch can have a part-polygonal section, for example.

Of course, in a variant that is not shown, the indexing mark 90 can be at a different location on the pole wheel 20; 22, for example closer to one of the claws 26 than the other.

As represented in FIGS. 5 and 6 in particular, each pole wheel 20; 22 includes two diametrally opposed angular indexing marks 90.

Alternatively, each pole wheel 20; 22 can have a different number of the indexing marks 90, for example only one indexing mark 90. In any case, the number of the indexing marks 90 on each pole wheel 20, 22 is less than a number of claws 26 of each pole wheel 20, 22, as shown, for example, in FIG. 5.

Figure 2:
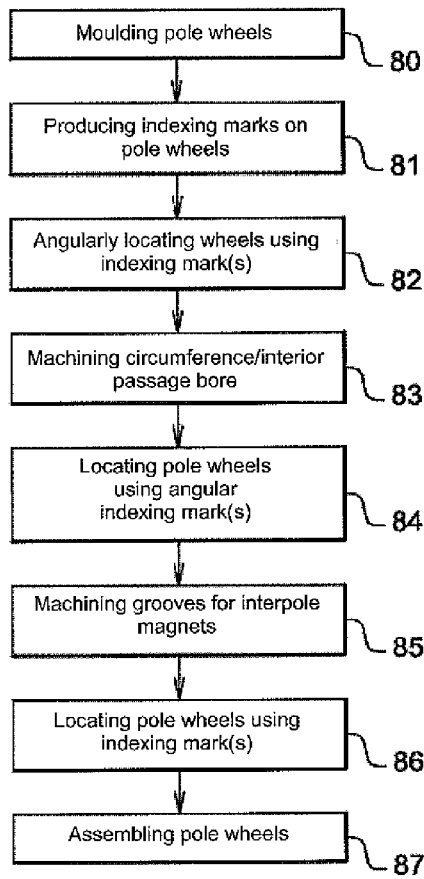
FIG. 2 is a block diagram illustrating steps in the manufacture of the pole wheels and their assembly to form the FIG. 1 alternator.

After the formation of the angular indexing marks 90, in a step 82 represented in FIG. 2, the pole wheel 20; 22 is placed on a machine tool, not shown, with an angular orientation determined depending on the indexing marks 90, which serve as angular references.

To this end, the machine is equipped with locating rods that can cooperate with the indexing marks 90 to locate the pole wheel 20; 22 in a predetermined angular position.

Once that angular position has been achieved, in a step 83, a milling tool of the machine tool machines a circumferential face 94 of the claws 26 of the pole wheel 20; 22 (see FIG. 4) to finish the outside diameter of the wheel.

The machine tool also produces a bore in the pole wheel 20; 22 to form the interior passage 38.

Then, in a step 84, the pole piece 20; 22 is transported to another machine tool on which the pole wheel is placed in a required angular position, in particular by causing a locating rod of the machine to cooperate with only one of the indexing marks, in conjunction with the introduction of an expandable chuck into the interior passage 38 of the pole wheel.

Thus only one of the two indexing marks 90 is used to locate the pole wheel during the step 84. Alternatively, it is possible to use the two marks to locate the pole wheel.

Once the pole wheel 20; 22 has been located in this way, the grooves 71 are machined using a milling tool (not shown) of the machine.

Thus, machining being carried out before assembling the pole wheels, the type of milling tool used to machine the grooves 71 can be chosen so as to be able to form a groove 71, and thus an interpole space 28, of small size, thus enabling small magnets 30 to be inserted into the interpole spaces.

Figure 9:
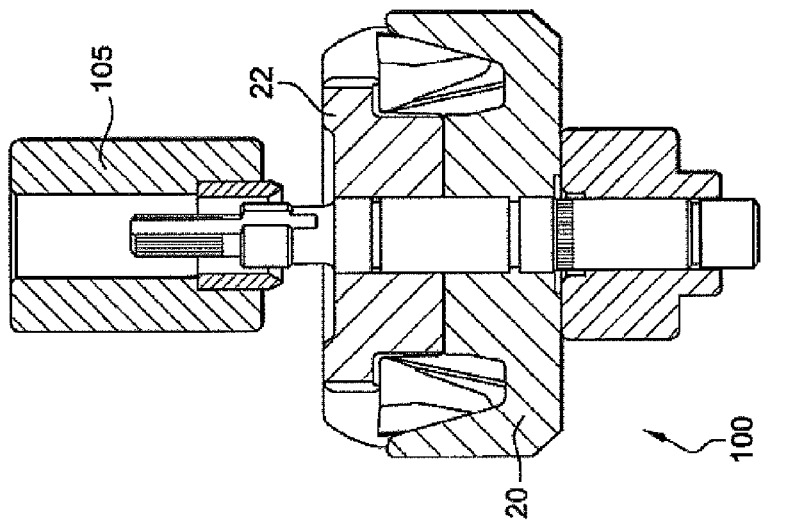
FIGS. 7 to 9 are partial diagrammatic representations of different steps in the assembly of the two pole wheels of the FIG. 1 alternator.
Figure 8:
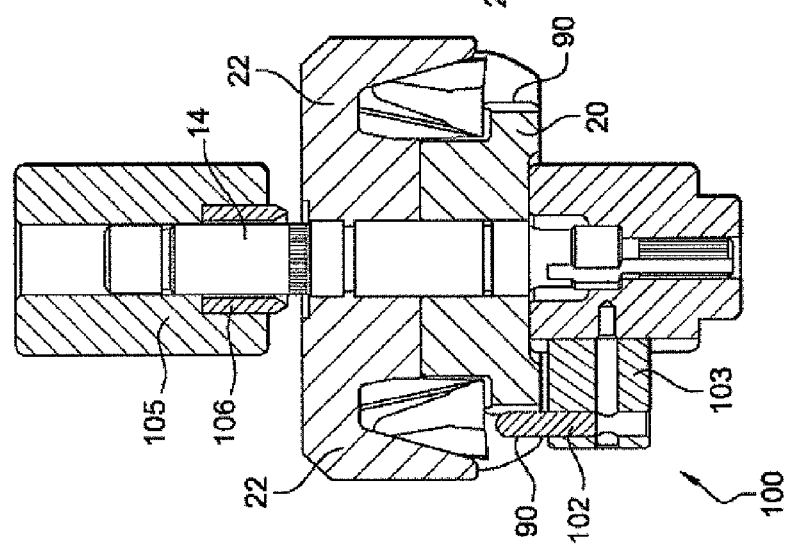
Figure 7:
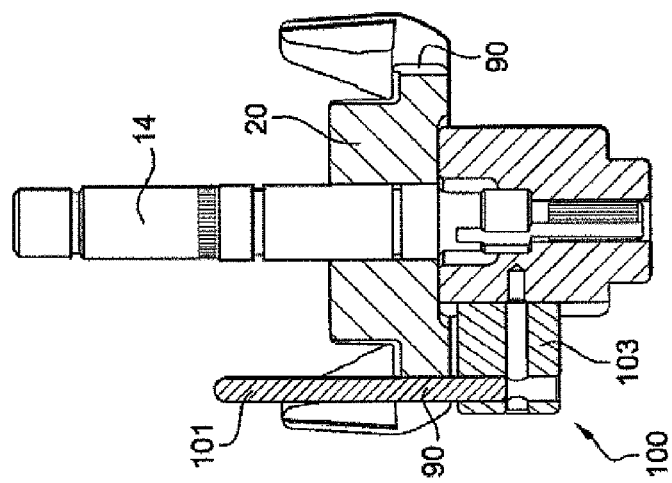

Then, in steps 86 and 87, the two pole wheels 20 and 22 are placed on a base 103 of an assembly machine 100 represented in FIGS. 7 to 9.

Precise angular location of the pole wheels 20 and 22 is achieved by the cooperation of the locating rods 101 (see FIG. 7) and 102 (see FIG. 8) of the machine 100 with the angular indexing marks 90 of the wheels 20; 22.

In the step illustrated in FIG. 7, the pole wheel 20 is introduced onto the shaft 14 via the interior passage 38, whereas the pole wheel is located angularly by cooperation of the rod 90 with the indexing mark 90.

In the FIG. 8 step, the rod 101 is retracted and the other, shorter rod 102 engages with the indexing mark 90 so as to release the space necessary for mounting the other pole wheel 22 after fitting the coil 34.

The pole wheel 22 is located in a predetermined angular position by one or more locating rods (not shown) of the machine 100.

Once the wheels 20 and 22 have been pressed together, a tool 105 with a blade 106 is applied to the wheel 22 to crimp the wheel 22 onto the shaft 14.

Figure 3:
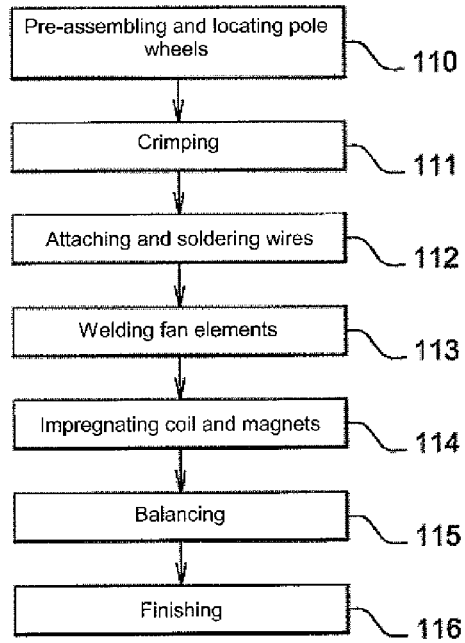
FIG. 3 is a block diagram illustrating steps in the manufacture of the rotor of the FIG. 1 alternator.

Steps in the manufacture of the rotor 12 from the pole wheels 20 and 22 are described next with reference to FIG. 3:

- pre-assembling (step 110) the pole wheels 20 and 22, the shaft 14, the coil 34, the magnets 30 and the foils 72, as described above,
- crimping the pre-assembly to lock the various elements (step 111), compressing the material of the pole wheels onto a predetermined area of the shaft,
- attaching and soldering the wires of the coil (step 112),
- welding the fan elements 54 and 56 (step 113),
- impregnating the coil 34, fan elements and magnets 30 with varnish (step 114),
- balancing the resulting rotor 12 (step 115), for example by forming one or more holes in the pole wheel,
- finishing (step 116), for example machining conductive tracks of the collector.

Of course, the invention is not limited to the embodiment that has just been described.

The invention claimed is:

1. A rotor for a rotating electrical machine, comprising a pair of pole wheels (20; 22) assembled into said rotor, each said pole wheel including:

a transverse flange (24);

a plurality of claws (26) spaced apart in a specified angular relation in a circumferential direction and extending substantially in an axial direction, the claws (26) connected to a periphery of the transverse flange (24) so as to form recesses between any two consecutive claws (26) of the pole wheel; and at least one angular indexing mark (90) configured to locate the pole wheel in a required angular position thereof with respect to said claws and produced by removing material;

the number of the angular indexing marks (90) being less than the number of claws (26);

the at least one angular indexing mark (90) including a notch formed substantially entirely in one of the recesses between the two consecutive claws of the pole wheel so as to extend substantially in the axial direction, and;

wherein the claws of said pole wheels are oppositely oriented, such that the claws of one of said pole wheels are oriented toward the recesses of the other of said pole wheels, each of said claws including a machined axially oriented groove (71) therein to accept an entire longitudinal body portion, in both radial and axial extent, of an inserted magnet in an interpole space defined between said machined grooves in adjacent oppositely-oriented claws (26).

2. The rotor according to claim 1, wherein the notch is a machined notch.

3. A rotating electrical machine (1), including a stator and a rotor as defined in claim 1.

* * * * *